Oct. 16, 1934. L. JOY 1,976,941

BATTERY CABLE CONNECTER

Filed March 31, 1933

INVENTOR.
Leonard Joy
BY
ATTORNEY.

Patented Oct. 16, 1934

1,976,941

UNITED STATES PATENT OFFICE 1,976,941

BATTERY CABLE CONNECTER

Leonard Joy, Detroit, Mich., assignor of one-half to J. Gordon Hart, Detroit, Mich.

Application March 31, 1933, Serial No. 663,699

5 Claims. (Cl. 173—259)

The present invention pertains to a novel battery post clamp designed particularly for use in connection with the batteries of motor vehicles. The principal object is to provide a clamp which lends itself to convenient engagement and adjustment with a proper tool.

Battery clamps hitherto employed are usually adjusted by means of a screw or bolt which lies in a horizontal plane or perpendicular to the axis of the clamping ring. The adjusting nut thus lies in a vertical plane where it is not conveniently engageable with a wrench. According to the present invention, the adjusting bolt lies vertical or parallel to the axis of the clamping ring, and the adjusting nut lies in a horizontal plane at the upper end of the bolt, where it is readily and conveniently engaged for adjustment. The lower end of the bolt is formed with a sloped surface cooperating with another sloped surface on one of the clamped parts so that adjustment of the bolt affects the tightness of the clamping ring.

Another object of the invention is to protect the battery post from blows struck carelessly upon the clamping ring. This object is accomplished by spacing the upper end of the ring out of direct contact with the post, so this end may be struck a tap or blow without direct or indirect injury to the post.

The invention is fully disclosed by way of example in the following description and in the accompanying drawing, in which Figure 1 is a plan view of the device;

Reference to these views will now be had by use of like characters which are employed to designate corresponding parts throughout.

Figure 6:
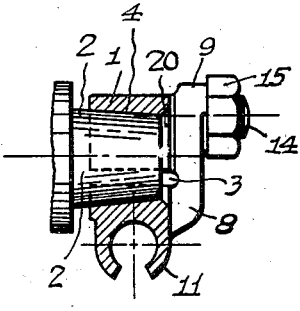
Fig. 6 is an enlarged section on the line 6—6 of Fig. 1.

The clamp embodies a ring 1 adapted to fit over a battery post 2 and split lengthwise in its wall, as indicated by the numeral 3, whereby the ring may be contracted on the post by means presently to be described. The post 2 is usually tapered, and likewise the inner surface or bore 4 of the ring is tapered at the same angle as may be clearly seen in Fig. 6.

The means for contracting the ring involves two body parts extending outwardly from the ring at opposite sides of the split. One of these parts is designated by the numeral 5 and extends straight outwardly from the ring at one side of the split, having a straight wall 6 emanating from the split and an opposite wall 7 which slopes upwardly and outwardly. The other piece 8 extending from the ring at the other side of the split has a portion 9 projecting across the top of the piece 5 but severed therefrom by a narrow cut 10 which may be formed after the device is cast. This cut is necessary to maintain a separation between the parts 5 and 8 so that they may be drawn together to contract the ring on the post 2. One side of the piece 8 is formed with a socket 11 into which is secured the bare end of an electric cable 12 in a manner well known to the art.

The projecting portion 9 of the part 8 has a hole 13 drilled therethrough parallel to the axis of the ring 1. A bolt 14 is mounted in the hole and carries at its upper end a nut 15 which bears upon the portion 9. The lower end carries a foot piece 16 which has a sloped surface 17 in contact with the sloped side 7 of the body part 5.

Assuming that the ring is initially large enough to receive the post 2, it may now be seen that rotation of the nut 15 in the direction which draws the bolt upwardly causes the foot piece 16 to move the piece 5 towards the piece 8 whereby the ring 1 is contracted on the post. The nut is turned until the desired degree of tightness is attained. In order to loosen the clamp, the nut 15 is first turned so that it recedes from the foot piece 16. The bolt will not usually drop of its own accord, due to its wedging action, and may be struck a tapping blow on its upper end to release the foot piece 16 from the adjacent piece 5, whereupon the clamp may readily be lifted off the post 2.

Figure 1:
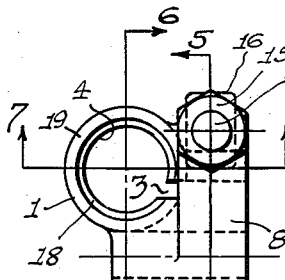
Figure 2:
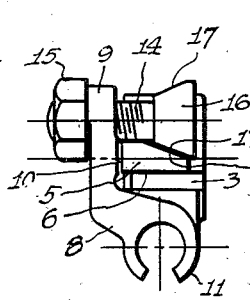
Fig. 2 is an end view.
Figure 3:
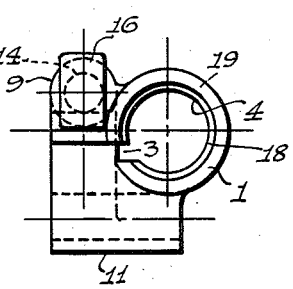
Fig. 3 is a bottom plan view.
Figure 4:
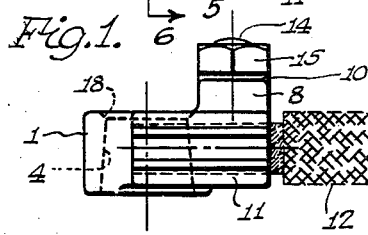
Fig. 4 is a side elevation.
Figure 5:
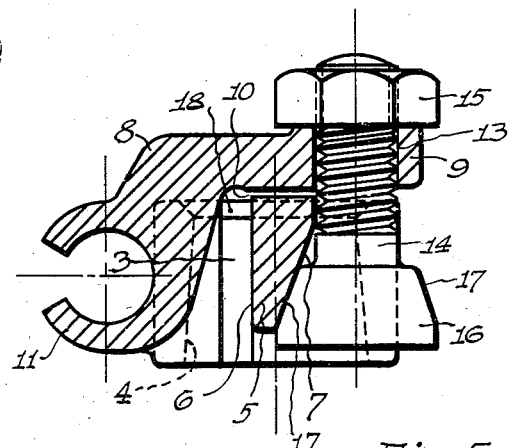
Fig. 5 is an enlarged section on the line 5—5 of Fig. 1.
Figure 7:
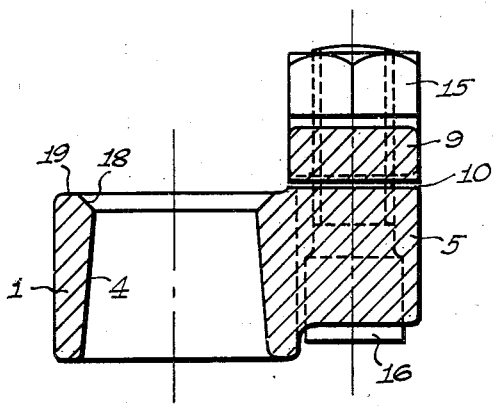
Fig. 7 is a section on the line 7—7 of Fig. 1, showing also the battery post on which the clamp is mounted.

The upper end of the bore 4 of the ring 1 is preferably flared outwardly as indicated by the numeral 18 to form an upper projecting portion 19 spaced from the post as indicated by the numeral 20 as illustrated in Fig. 7. Thus, blows applied to the upper end of the ring in the manipulation of the device cannot injure or mar the upper edge of tapered bore 4, thus preventing the consequent marring of the lead post 2.

The clamp may be cast in bronze or other resilient metal permitting contraction at the split and is finished in any suitable manner to define the split and the cleavage between the parts 5 and 8. It is also preferably coated with lead by immersion in molten lead for protection from the corrosive action of the acid of the battery.

The distinguishing feature lies in the fact that the clamping bolt lies parallel to the axis of the ring, with the adjusting nut lying in a horizontal plane at the top of the clamp, where it may readily and conveniently be engaged with a wrench. This position of the nut is decidedly more convenient for adjustment than in the case where the bolt is horizontal and the nut rotates in a vertical plane.

Although a specific embodiment of the invention has been illustrated and described, it will be understood that various alterations in the details of construction may be made without departing from the scope of the invention, as indicated by the appended claims.

What I claim is:—

1. A battery post clamp comprising a split ring, body parts extending outwardly from said ring at opposite sides of the split thereof, one of said body parts having a projecting portion extending over the other part, a threaded member passed through said projecting portion and lying parallel to the axis of said ring and adjacent to the outside face of said other part, means for adjusting said threaded member axially, and means carried by said threaded member and engaging the other of said parts for drawing said parts together and contracting said ring on adjustment of said threaded member.

2. A battery post clamp comprising a split ring, body parts extending outwardly from said ring at opposite sides of the split thereof, one of said body parts having a projecting portion extending over the other part, a threaded member passed through said projecting portion and lying parallel to the axis of said ring and adjacent to the outside face of said other part, means for adjusting said threaded member axially, and a sloped member carried by said threaded member and engaging the other of said parts for drawing said parts together and contracting said ring on adjustment of said threaded member.

3. A battery post clamp comprising a split ring, body parts extending outwardly from said ring at opposite sides of the split thereof, one of said body parts having a projecting portion extending over the other body part, a bolt passed through said projecting portion and lying parallel to the axis of said ring and adjacent to the outside face of said other body part, a nut threaded on one end of said bolt and bearing against said projecting portion for adjusting the bolt axially, and means carried by the other end of said bolt and engaging said other part for drawing said parts together and contracting said ring on adjustment of the bolt.

4. A battery post comprising a split ring, body parts extending outwardly from said ring at opposite sides of the split thereof, one of said body parts having a projecting portion extending over the other body part, a threaded member passed through said projecting portion and lying parallel to the axis of said ring adjacent to the outside face of said other part, means for adjusting said threaded member axially, and a foot piece carried by said threaded member and engaging said other part, said foot piece and said other part having sloped surfaces in contact with each other, whereby to draw said parts together and contract said ring on adjustment of said means.

5. A battery post clamp comprising a split ring, body parts extending outwardly from said ring at opposite sides of the split thereof, one of said parts extending over the other, a bolt passed through said part and lying parallel to the axis of said ring, a nut bearing against the last named part for adjusting the bolt axially, and a foot piece carried by the other end of said bolt and engaging the other of said parts, said foot piece and the last named part having sloped surfaces in contact with each other, whereby to draw said parts together and contract said ring on adjustment of said bolt.

LEONARD JOY.